A. SIDDALL.
Corn Sheller.
No. 24,583.  Patented June 28, 1859.
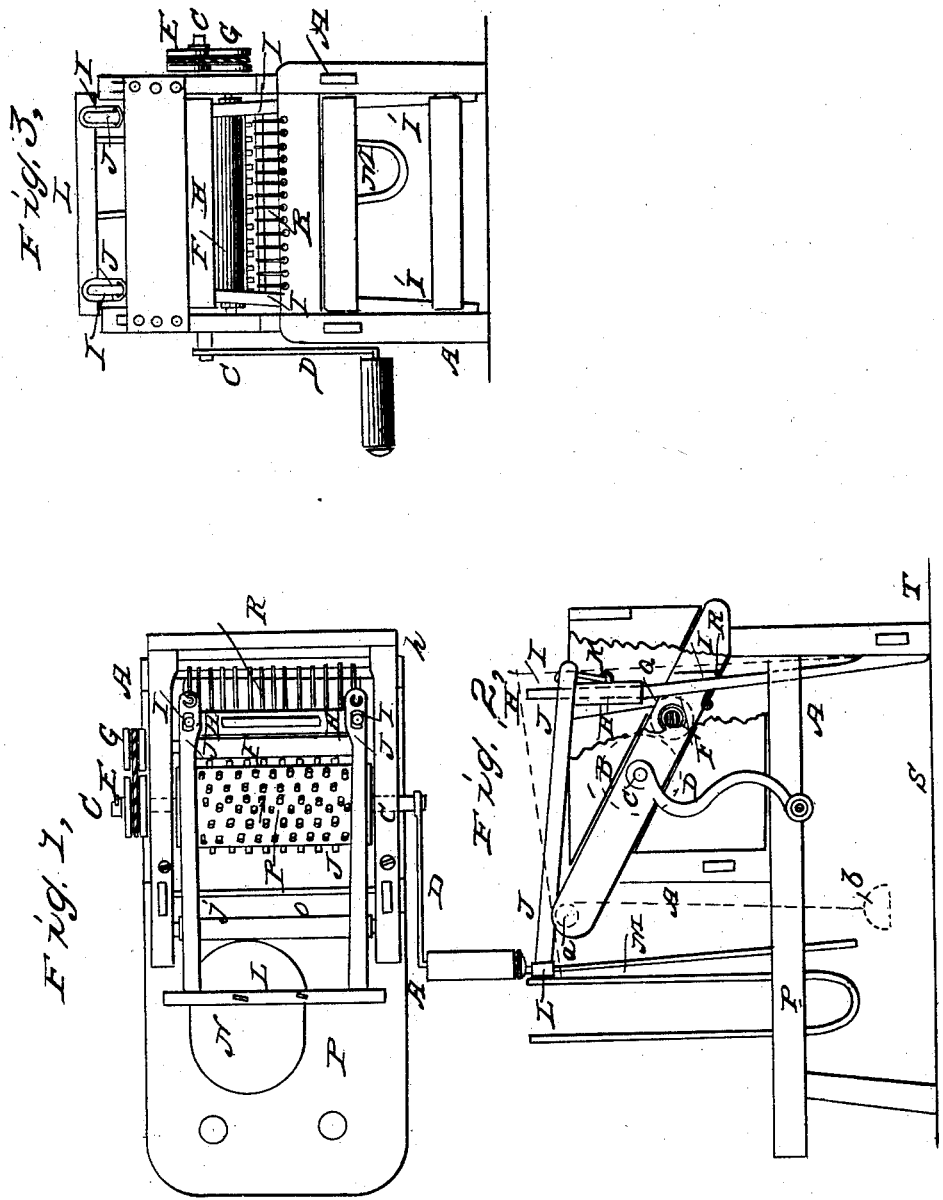
WITNESSES:
INVENTOR:

UNITED STATES PATENT OFFICE.

A. SIDDALL, OF RANSOM, MICHIGAN.

CORN-SHELLER.

Specification of Letters Patent No. 24,583, dated June 28, 1859.

*To all whom it may concern:*

Be it known that I, A. SIDDALL, of Ransom, in the county of Hillsdale and State of Michigan, have invented certain new and useful Improvements in Corn-Shellers; and I do hereby declare that the following is a full, clear, and exact description of the construction and operation of the same, reference being had to the annexed drawings, making part of this specification in which—

Figure 1, is a plan view; Fig. 2, a side view; Fig. 3, a front end view.

Like letters denote like parts in the several views.

The machine herein represented is designed to shell corn either wet or dry, large and small, with the same facility, and the cobs are discharged from the machine separate from the corn.

The general form of this machine herein shown may be varied according to the nature of the case, without changing the mode of operation, and the frame A, may be made of wood or iron, to which is connected the toothed cylinder B, Figs. 1 and 2, the shaft C, of which revolves in boxes connected to the frame. At one end of this shaft is attached the crank D, for operating the cylinder. At the other end of the shaft is keyed the pulley E, which belts onto the pulley G, as seen in Figs. 1 and 3. This pulley is attached to the shaft of the roller F, which shaft is provided with proper bearings connected with the frame directly in front of the cylinder. If desired the roller and cylinder may be operated by any other suitable means besides the crank.

Directly in front of the cylinder and roller is placed a pressure bar H, to which is connected the springs I, I, the upper ends of which pass through the pressure bar and the ends of the levers J, J, as seen in Figs. 1 and 3. The lower ends of the springs are firmly secured to the frame at I. The levers J, J, are connected to the pressure bar by hooks, or its equivalents as seen at K, Fig. 2. On the springs directly below the pressure are formed shoulders upon which the pressure bar rests, at the same time it moves with the springs. The pressure bar also slides up and down on the upper end of the springs by the action of the levers J, J. These levers are connected to the crossbar L, from which depends the stirrup M, through the opening N, of the seat. The levers J, J, rest upon the roller O which forms a bearing, and fulcrum for the levers.

The person operating the machine may either stand or be seated upon the seat P, with one leg on the outside and the other in the opening N, so that the knee will rest in the stirrup. In this position it is convenient and easy to operate the crank, so that the cylinder will turn in the direction of the arrow, and the roller G, by its connection with the cylinder will turn in the same direction.

The ears of corn are dropped in between the pressure bar and cylinder, the ear is then rapidly turned and the grain stripped from it at the same time by the action of the teeth and cylinder. The ear during the process of shelling rests upon the roller F, and as it revolves, it aids in turning the ear and discharging it from the machine when the corn is all stripped off from the ear. As soon as the corn is stripped from off the ear, it may be readily discharged from the machine by pressing the knee down on the stirrup which so acts on the levers J, J, as to raise the pressure bar up to H' and from the cylinder, which will leave a space below the pressure bar, through which the cob will pass, the direction of the cylinder and roller being such as to throw the cob and grain from the machine. By pressing against the bar L, at the time the levers J, J, are raised, it causes the pressure bar H, to move back from the cylinder at the time it is raised. This will give more space below the bar H, for the escape of extra sized cobs. While the ear is being shelled the grain is thrown against the pressure bar, and drops down through the space Q, Fig. 2, below the bar onto the screen R, through which it passes to the ground at S. The cobs on being discharged from the machine pass to the ground at T. Thus the corn and cobs are effectually separated from each other. More or less pressure may be given to the pressure bar H, as may be needed in case the ear is very large or very small by pushing or drawing the cross bar L, so that the pressure bar will be closer or farther from the cylinder, but this only need be in extreme cases. As a general thing, the springs will answer all purposes for keeping the bar H, in place for shelling all sizes and kinds of corn.

If desirable, the person may stand up and operate the machine, and the stirrup M, so arranged as to pass over the roller O, or over a pulley on the outside of the frame as seen at *a*, Fig. 2, and then extend down, so as to be operated by the foot pressing upon the stirrup at *b*. The bar H, could then be moved back for the discharge of the cobs in the same manner as if operated by the stirrup M. Other methods substantially the same as this may be used without changing the nature or principle of operation.

What I claim as my invention and desire to secure by Letters Patent is—

The arrangement of the stirrup M, with the levers J, J, for operating the adjustable sliding pressure bar H, in the manner described for the purpose set forth.

ADON SIDDALL.

Witnesses:
 HENRY WALDRON,
 C. J. DICKERSON.